Patented May 23, 1933

1,911,009

UNITED STATES PATENT OFFICE

KARL WOIDICH, OF VIENNA, AUSTRIA, ASSIGNOR TO THE FIRM GERT & CO., OF VIENNA, AUSTRIA

PROCESS FOR THE ACCELERATION OF MEAT PICKLING PROCESSES

No Drawing. Application filed October 30, 1930, Serial No. 492,367, and in Austria April 4, 1930.

The duration of the usual meat pickling process is adjusted in accordance with the size of the pieces to be pickled. This is disadvantageous from an economical point of view as the demand for meat varies periodically.

A part from the mentioned process a rapid pickling process is known in which nitrites are used.

The present invention enables the pickling time to be varied within wide limits according to the wish of the person in charge. It consists therein that the pickling is accelerated to a smaller or greater extent by the addition of hypophosphorous or phosphorous acid or salts of these acids to one of the usual pickling salt mixtures (e. g. common salt, saltpetre, sugar) or to the pickling brine obtained therefrom.

The pickling process is accelerated the more, the greater the quantity is of the above mentioned additions used. The quantity of hypophosphorous or phosphorous acid to be added, however, is extremely small when compared to the amount of pickling salt used. Good results are obtained with a 2% addition, referring to the total quantity of pickling salt. As on the conclusion of the pickling, the pickling brine is removed in known manner, 5 to 6% of the quantity used of hypophosphorous or phosphorous acid or the salts of these acids may remain in the pickled meat. This is the minimum quantity. It may be pointed out, however, that hypophosphorous acid or phosphorous acid salts not only are not harmful to health but are actually presecribed by the medical profession as nourishing and strengthening means (hypophosphorous acid lime-iron syrup).

The addition of hypophosphorous and phosphorous acid or the corresponding salts may be made to the solid pickling salt or to a solution thereof. The duration of the pickling can be regulated by varying the quantity of added substance and can be predetermined.

Having now particularly described and ascertained the nature of my said invention, and in what manner the same is to be performed, I declare that what I claim is:—

1. The treatment of meats to accelerate the pickling process thereof, which comprises subjecting the meats to the action of a solution containing pickling salts and hypophosphorous acid.

2. The treatment of meats to accelerate the pickling process thereof, which comprises subjecting the meats to the action of phosphorous acid in the presence of a pickling salt.

3. The treatment of meats to accelerate the pickling process thereof, which comprises subjecting the meats to the action of a solution containing pickling salts and the salts of phosphorous acid.

4. The treatment of meats to accelerate the pickling process thereof, which comprises subjecting the meats to the action of a member of the group consisting of hypophosphorous acid, phosphorous acid and salts of phosphorous acids in the presence of pickling salt.

In testimony whereof I affix my signature.

KARL WOIDICH.